United States Patent [19]

Edwards et al.

[11] Patent Number: 4,744,218
[45] Date of Patent: May 17, 1988

[54] POWER TRANSMISSION

[76] Inventors: Thomas L. Edwards, 7831 Almont Rd., Almont, Mich. 48003; Yehia M. El-Ibiary, 5947 Diamond, Troy, Mich. 48098; Rajamouli Gunda, 679 Rutgers Rd., Rochester, Mich. 48063; Richard S. Leemhuis, 3494 Eagle, Troy, Mich. 48083; Fred H. Phillips, 6170 Niles, Troy, Mich. 48098; Melvin A. Rode, 6861 N. Clunbury Rd., West Bloomfield, Mich. 48033

[21] Appl. No.: 849,542

[22] Filed: Apr. 8, 1986

[51] Int. Cl.⁴ .............................................. F16D 31/00
[52] U.S. Cl. ........................................ 60/368; 91/361;
165/22; 172/2; 414/699; 340/825.06
[58] Field of Search ...................... 60/368, 420; 165/22;
236/51; 172/2, 3; 91/424, 427; 414/699, 825.06,
825.52; 340/825.06; 364/505, 513

[56] References Cited

U.S. PATENT DOCUMENTS

| 3,716,096 | 2/1973 | Berrett et al. | 340/825.06 X |
| 3,978,451 | 8/1976 | Ito et al. | 340/825.05 |
| 4,212,078 | 7/1980 | Games et al. | 165/22 X |
| 4,622,551 | 11/1986 | Kupersmith et al. | 340/825.06 |
| 4,687,179 | 8/1987 | Smith | 91/361 X |

FOREIGN PATENT DOCUMENTS

| 2729408 | 1/1979 | Fed. Rep. of Germany . |
| 3145894 | 5/1983 | Fed. Rep. of Germany . |
| 2052642 | 1/1981 | United Kingdom . |
| 8501007 | 3/1985 | PCT Int'l Appl. . |

Primary Examiner—William E. Wayner
Attorney, Agent, or Firm—Barnes, Kisselle, Raisch, Choate, Whittemore & Hulbert

[57] ABSTRACT

An electrohydraulic system includes a plurality of electrohydraulic devices individually controlled by microprocessor-based control electronics. The device controllers are connected in common by a bidirectional serial data bus to a master controller for coordinating operation of the various devices. Internal programming within the master controller establishes a repetitive time-sequence of windows for communications with the various device controllers for downloading control signals and parameters, and for uploading data indicative of system status and operation. The various device controllers include internal programming for operating the associated hydraulic devices as a function of control signals and parameters received from the master controller.

18 Claims, 7 Drawing Sheets

MASTER CONTROLLER OPERATION SEQUENCE

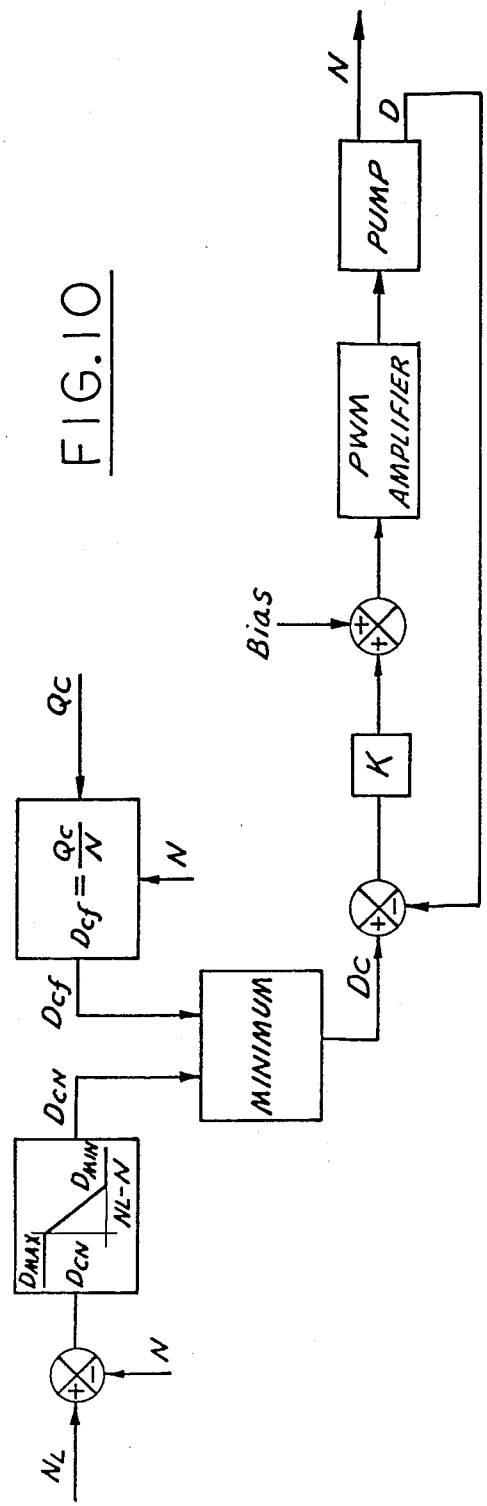

POWER TRANSMISSION

The present invention is directed to electrohydraulic servo systems of the type which include a plurality of electrohydraulic devices coupled to a remote master controller.

BACKGROUND AND OBJECTS OF THE INVENTION

In electrohydraulic systems which include a plurality of electrohydraulic devices, such as servo actuators, motors and pumps, it is conventional practice to couple all of such devices to a remote master controller for coordinating device operation to perform desired tasks. Motors and actuators may be employed, for example, at several coordinated stages of a machine tool line for automated transfer and machining of parts at a series of work stations. In another typical application, the moving components of an earth excavator may be coupled to electrohydraulic actuators controlled by a master controller responsive to operator level or joystick inputs. In accordance with conventional practice, the master controller is coupled through individual digital-to-analog converters to the various remotely-positioned electrohydraulic devices for supplying control signals thereto. For closed-loop operation, a sensor is positioned at each electrohydraulic device for sensing operation thereof, and feeds a corresponding sensor signal to the remote master controller through an analog-to-digital converter or appropriate signal conditioner.

Thus, in a system which embodies a plurality of electrohydraulic devices, a substantial quantity of electrical conductors must be provided for feeding individual control signals to the various devices and returning sensor signals to the master controller. Such conductors interfere with system design and operation, and are subject to failure, add to the expense and complexity of the overall system.

It is therefore a general object of the present invention to provide an electrohydraulic servo system which exhibits reduced cost and complexity as compared with prior art systems of the character described. In furtherance of the foregoing, a more specific object of the invention is to provide a system of the described character wherein each of the system electrohydraulic devices is controlled by a dedicated local microprocessor-based controller adapted to communicate with a central or master controller over a common data bus for thereby distributing control of the several electrohydraulic devices and reducing interconnection cost and complexity while maintaining overall system coordination.

SUMMARY OF THE INVENTION

In accordance with the present invention, an electrohydraulic servo control system which includes a plurality of electrohydraulic devices coupled to a remote master controller is characterized in that such interconnection is accomplished by a bus common to all of the master and device controllers, and in that all of the device controllers are constructed for connection to the common bus for individual communication with the master controller. In the preferred embodiments of the invention, each of the device controllers includes microprocessor-based control electronics with facility for setting a communication address unique from addresses of all other device controllers connected to the communication bus, such that the master controller may communicate individually with each device controller as a function of associated device addresses.

Most preferably, the interconnection bus comprises a bidirectional serial data bus which connects input ports of the various device controllers in common to an output port of the master controller, and which connects output ports of the various device controllers in common to an input port of the master controller. A power supply applies electrical power to conductors of the common bus, and each of the remote device controllers receives electrical power exclusively from the data bus, such that a system power failure automatically removes power from all device controllers and returns the various controlled electrohydraulic devices to their neutral positions.

The master controller includes facility for establishing a repetitive time sequence of communication windows and for communicating with each of the device controllers in turn during an associated window. During such bidirectional communication, command signals for control of individual devices, as well as other control parameters, may be downloaded to the device controllers, and status information indicative of device condition may be uploaded to the master controller for coordinating operation with the other devices and/or display to an operator. Where one of the electrohydraulic devices comprises a hydraulic pump, the master controller includes facility for establishing a speed limit at the pump, either automatically or by operator selection, and transmitting a signal indicative of such speed limit to the pump controller during the associated pump communication window. The pump controller includes microprocessor-based circuitry coupled to the pump and responsive to speed limit signals from the master controller for limiting operation at the pump to the corresponding speed limit.

BRIEF DESCRIPTION OF THE DRAWINGS

The invention, together with additional objects, features and advantages thereof, will be best understood from the following description, the appended claims and the accompanying drawings in which:

FIG. 10 is a flow chart which illustrates operation of the pump controller in a closed-loop load-limiting mode.

DETAILED DESCRIPTION OF PREFERRED EMBODIMENTS

Figure 1:
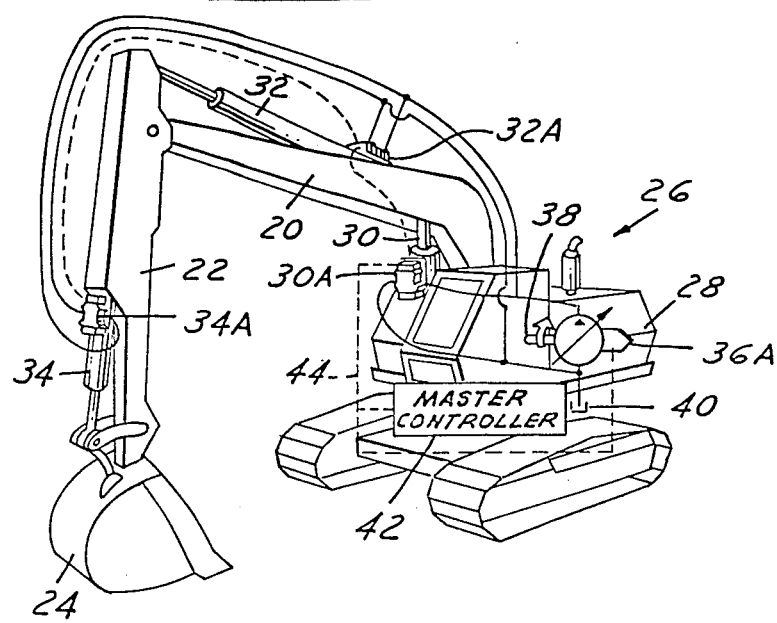
FIG. 1 is a schematic perspective view of an earth excavator having a boom, an arm, a bucket and a pump electrohydraulically controlled in accordance with the principles of the present invention.

The electrohydraulic control system of the present invention will be described in detail in conjunction with an exemplary application thereof for individually controlling motion of the boom 20, arm 22 and bucket 24 of an earth excavator 26 (FIG. 1) of generally conventional mechanical construction. The position of boom 20 with respect to the body 28 of excavator 26 is controlled by a linear hydraulic actuator 30. Likewise, the position of arm 22 with respect to boom 20 is controlled by the linear actuator 32, and the pivotal position of bucket 24 on the end of arm 22 is controlled by the linear actuator 34. Each of the actuators 30, 32, 34 has associated therewith an electrohydraulic servo assembly 30A, 32A, 34A. A variable displacement hydraulic pump 36 has an input shaft 38 coupled to the engine (not shown) of excavator 26. Pump 36 has an input connected to a fluid sump 40 and an output for supplying fluid under pressure to servo assemblies 30A, 32A and 34A. A master controller 42 is connected by a serial data bus 44 to a servo assembly 36A associated with pump 36, and to servo assemblies 30A, 32A and 34A associated with actuators 30, 32 and 34. In practice, a typical excavator 26 would additionally embody hydraulically controlled swing of body 28 and propulsion of the left and right tracks. These motion variables may also be controlled in accordance with the present invention.

Figure 3:
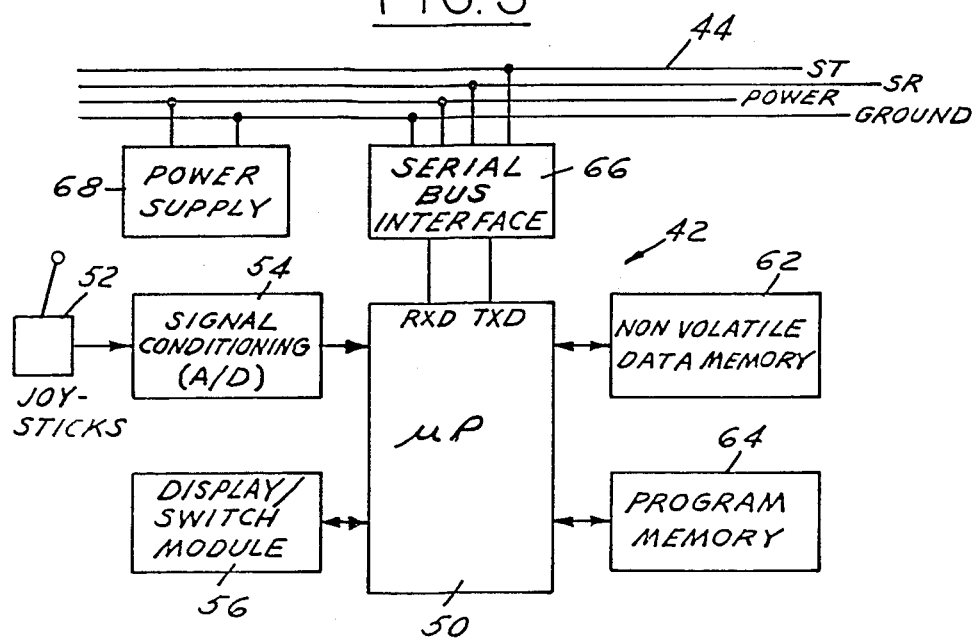
FIG. 3 is a more detailed functional block diagram of the master controller illustrated in FIG. 2.
Figure 2:
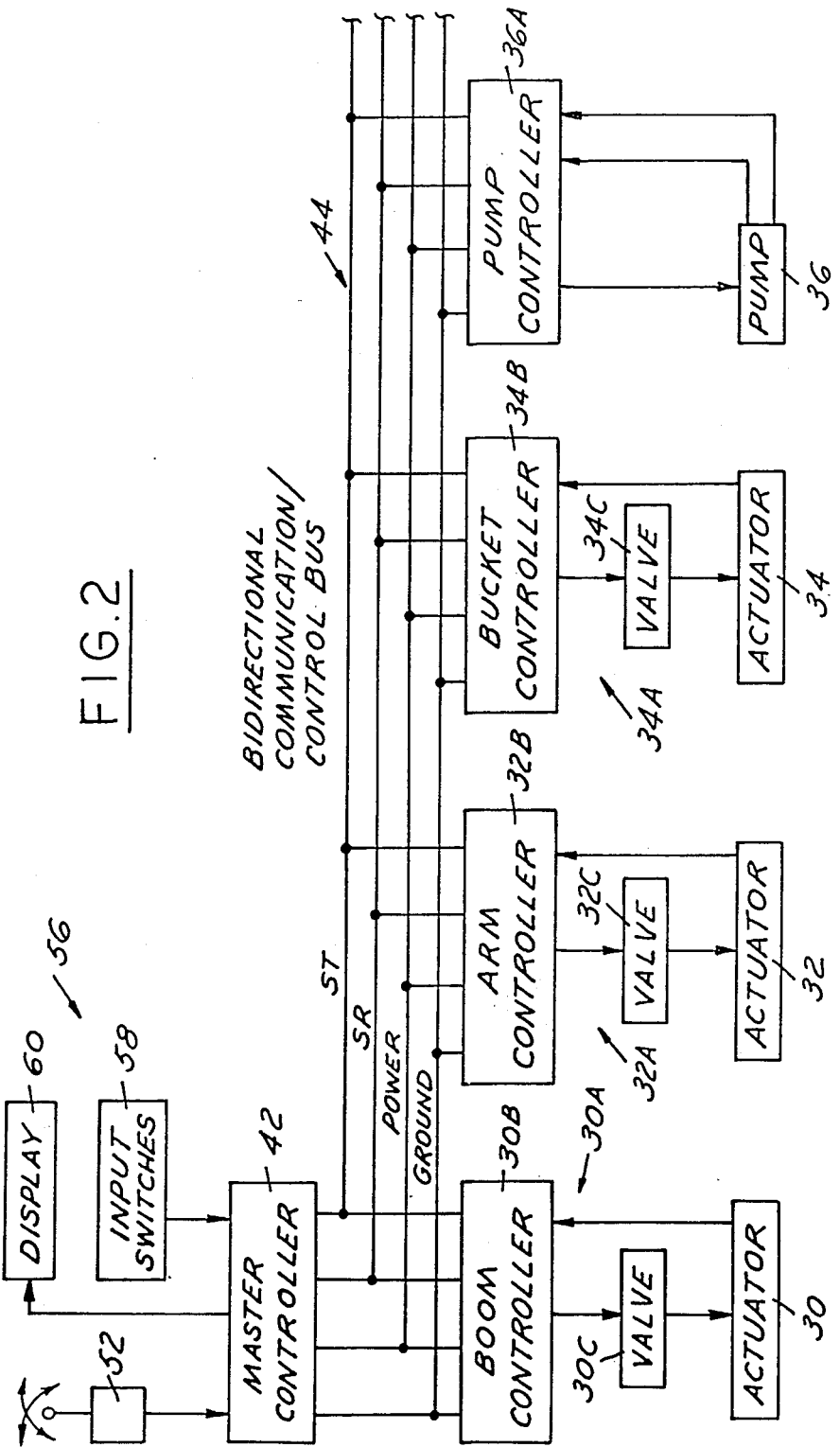
FIG. 2 is a functional block diagram of the electrohydraulic control system embodied in the excavator of FIG. 1.

Referring to FIGS. 2 and 3, master controller 42 includes a microprocessor 50 which receives operator inputs from a joystick or the like 52 through an a/d converter or other suitable signal conditioning circuitry 54. Microprocessor 50 also communicates with a display/switch module 56 which includes switches 58 for selective input or modification of system parameters by the operator, and a display 60 for indicating system status and operation to the operator. Microprocessor 50 is also interconnected with a nonvolatile data memory 62 for storing parameters required by the controlled devices, and to a memory 64 for storing system operating programs. Microprocessor 50 has an input port RXD and an output port TXD respectively connected through a serial interface 66 to a pair of conductors SR and ST of data bus 44. A power supply 68, which may comprise a battery supply or a generator supply powered by the engine of excavator 26, applies electrical power to a pair of bus conductors POWER and GROUND. Master controller 42 receives electrical power from such bus conductors.

Figure 4:
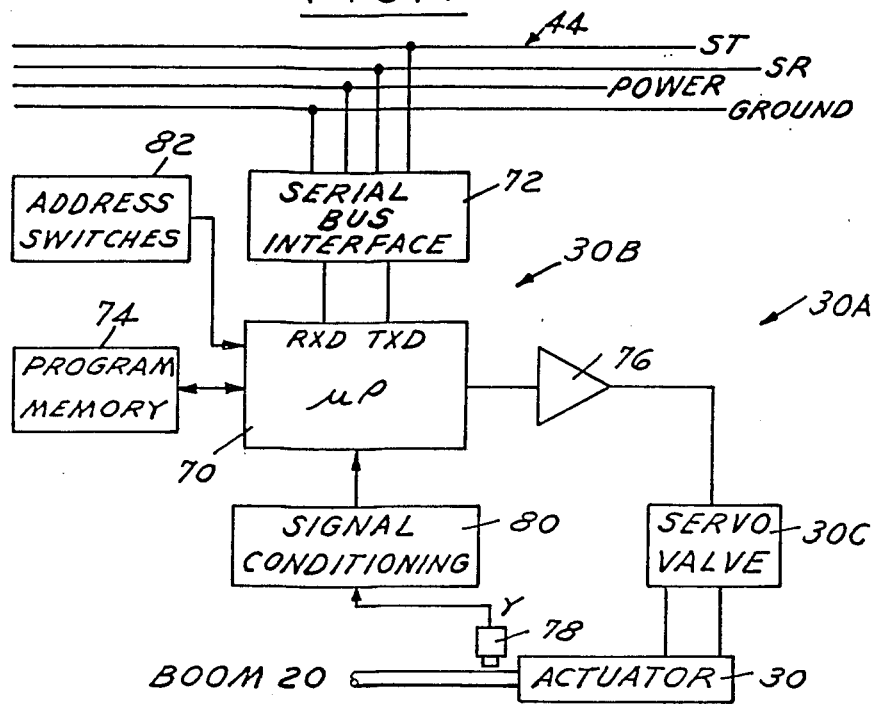
FIG. 4 is a more detailed functional block diagram of the boom controller illustrated in FIG. 2.

Each of the boom, arm and bucket servo assemblies 30A, 32A, and 34A includes an associated electronic controller 30B, 32B and 34B (FIG. 2) coupled through a servo valve 30C, 32C and 34C to the associated linear actuator 30, 32 and 34. Boom controller 30B (FIGS. 2 and 4) includes a microprocessor 70 having an input port RXD and an output port TXD respectively coupled through a serial interface 72 to the ST and SR conductors of bus 44. Boom controller 30B also receives electrical power from the POWER and GROUND conductors of bus 44 through serial. Microprocessor 70 is coupled to a memory module 74 having stored therein one or more programs for controlling operation of actuator 30. Exemplary control programs will be discussed in connection with FIGS. 8 and 9, and are selectable by the master controller. Microprocessor 70 is connected through a power amplifier 76 to provide pulse width modulated signals to servo valve 30C for controlling operation of actuator 30. A position transducer 78 is responsive to motion at actuator 30 for providing a position signal Y to microprocessor 70 through signal conditioning circuitry 80. Address selection switches 82 or the like are connected to microprocessor 70 for operator preselection of a communication address to be associated with boom controller 30B. A suitable servo valve assembly, which would include boom controller 30B and servo valve 30C in a single unit, is disclosed in copending application Ser. No. 849,540, filed concurrently herewith and assigned to the assignee hereof. Arm controller 32B and bucket controller 34B are structurally identical to boom controller 30B hereinabove described in detail.

Figure 5:
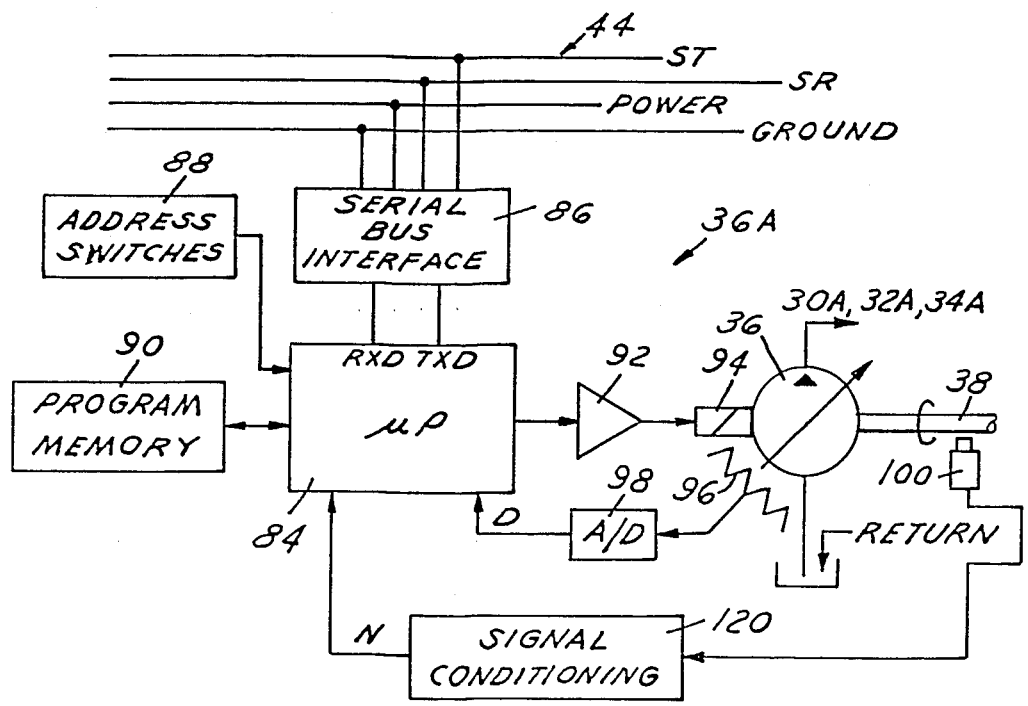
FIG. 5 is a more detailed functional block diagram of the pump controller illustrated in FIG. 2.

Pump controller 36A (FIG. 2) is illustrated in FIG. 5 as comprising a microprocessor 84 having an input port RXD and an output port TXD respectively connected to the ST and SR conductors of bus 44 through a serial interface 86. Thus, the input ports RXD of the boom, arm, bucket and pump controller microprocessors are connected in common (through serial interfaces) by the ST conductor of bus 44 to output port TXD of master controller microprocessor 50 (FIG. 3). Likewise, the output ports TXD of the boom, arm, bucket and pump controller microprocessors are connected in common (through serial interfaces) by the SR conductor of bus 44 to input port RXD of master controller microprocessor 50. Pump controller microprocessor 84 receives a communication address input from associated address switches 88, and is connected to a memory 90 having stored thereon the various pump control programs. One such program, selectable by the master controller, will be discussed by way of example in connection with FIG. 10. A power amplifier 92 feeds pulse width modulated control signals from microprocessor 84 to the control solenoid 94 of pump 36 for controlling yoke position, and thereby controlling the output of pump 36. A transducer 96 is connected through an a/d converter 98 for providing a signal D to microprocessor 84 indicative of yoke position. Likewise, a sensor 100 is operatively coupled to pump input shaft 38 to provide a signal N through conditioning circuitry 102 indicative of pump shaft speed.

Figure 6:
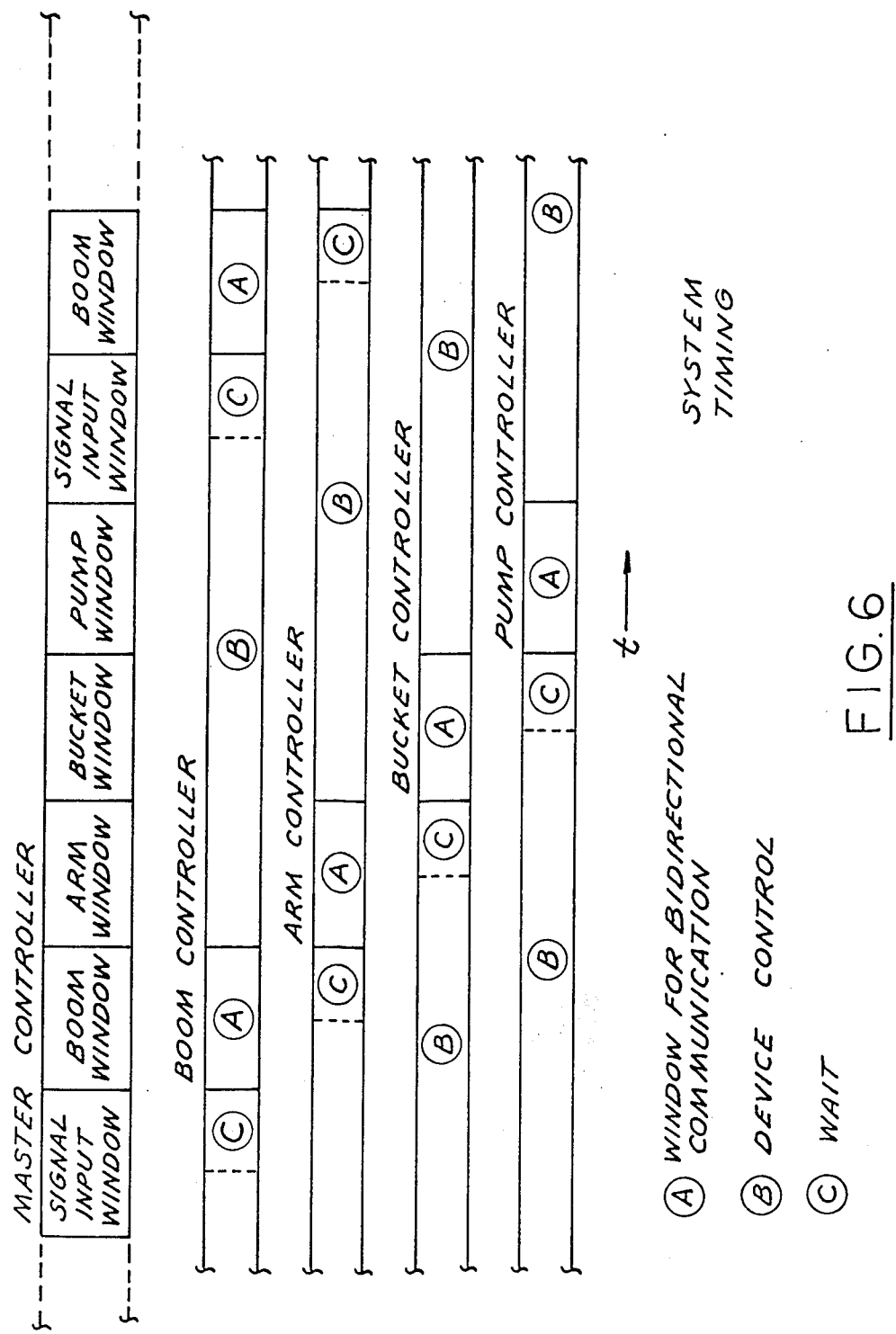
FIG. 6 is diagram which illustrates communication timing between the master controller and the various device controllers in accordance with a preferred embodiment of the present invention.
Figure 7:
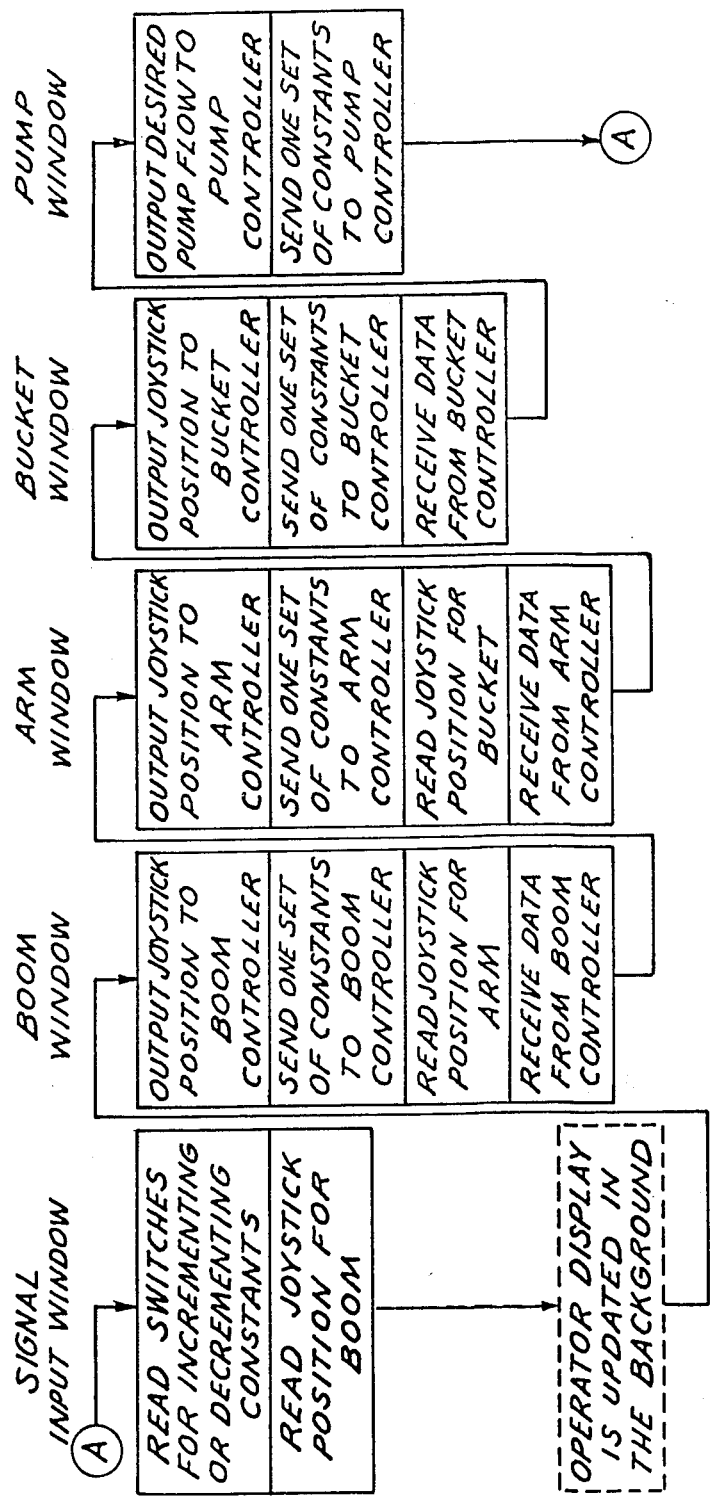
FIG. 7 is a flow chart which illustrates sequence of operations at the master controller.

FIGS. 6 and 7 illustrate sequence of operations and communications between the master controller and the device controllers. Referring to FIG. 6, programming within master controller microprocessor 50 and associated program memory 64 (FIG. 3) establishes a repetitive time-sequence of communication windows—i.e., a signal input window, a boom communications window, an arm communications window, a bucket communications window and a pump communications window—with the same sequence being repeated indefinitely. During the signal input window (FIGS. 6 and 7) master controller microprocessor 50 first reads operator switches 58 (FIG. 2) for incrementing or decrementing control parameters at the various device controllers, and then reads the operated boom-joystick position. The operator display is continuously updated in programming background. At commencement of the boom communications window, the master controller first transmits the boom controller address to establish communications with boom controller microprocessor 70 (FIG. 4), and then sequentially outputs or downloads boom joystick position and one set of parameter constants. Boom joystick position and updated constant are stored in memory at boom controller 30B for later use for control purposes. Meanwhile, the master controller microprocessor reads and stores operator joystick position for the excavator arm, and is then prepared to receive data uploaded from the boom controller indicative of controller status and to store such data in nonvolatile data memory 62 (FIG. 3). As shown in FIG. 7, a similar communication sequence takes place during each of the arm, bucket and pump communication windows. During the pump communications window, the master controller downloads a control signal indicative of pump output.

FIG. 7 also illustrates timing at each of the boom, arm, bucket and pump controllers relative to the sequence of master controller communication windows. Each of the device controllers is dedicated to communication with the master controller during the time of the corresponding communications window. Following such communications, each controller has an opportunity to implement motion control at its associated device while the master controller is communicating in turn with the other device controllers. However, device motion control must be completed before onset of the next communications window associated with a given controller. Toward this end, it is preferable that each of the sequential communication windows be of fixed, although not necessarily identical, time duration, so that the total time available for motion control at each device controller is pre-established and constant.

Table 1 at the end of the specification illustrates communications protocol between the master controller and one device controller during the associated communications window. At the onset of the communications window, a first communication frame consisting of a series of three bytes is transmitted from the master controller to the device controller. The first bit of the first byte consists of a "wakeup" bit set to 1, followed by parity bits for each of the three frame bytes, two unused bits and the three-bit address of the device with which communication is to be established. Such address must, of course, correspond to the device controller address established by switches 82 (FIG. 4) or 88 (FIG. 5). Bytes two and three of the first frame include data bits ("wakeup" bit set to zero) indicative of operator joystick position for the device controller. A second frame likewise includes a sequence of three bytes transmitted from the master to the device controller. The first byte includes parity bits for each byte (no wakeup bit), and the storage address into which subsequent data is to be loaded at the device controller. The second and third bytes of the second communication frame include data bits associated with control constants or parameters to be employed at the device controller. Additional frames can be transmitted similarly if required.

The third and fourth communication frames in Table I each include a sequence of three bytes transmitted from the device controller to the master controller indicative of device operation and status. The first byte of the third frame includes a wakeup bit, three parity bits and the address into which subsequent data is to be stored at the master controller. The second and third bytes of the third frame include such data. The first byte of the fourth frame again includes parity bits and data address bits, with the second and third bytes including associated data. Exemplary software in Intel assembly code for use in conjunction with Intel 8031 or 8051 microprocessor packages to implement the foregoing communication scheme accompanies this specification as Appendix A (communications window timing at the master controller), Appendix B (serial communications at the master controller) and Appendix C (serial communications at the device controller).

Figure 8:
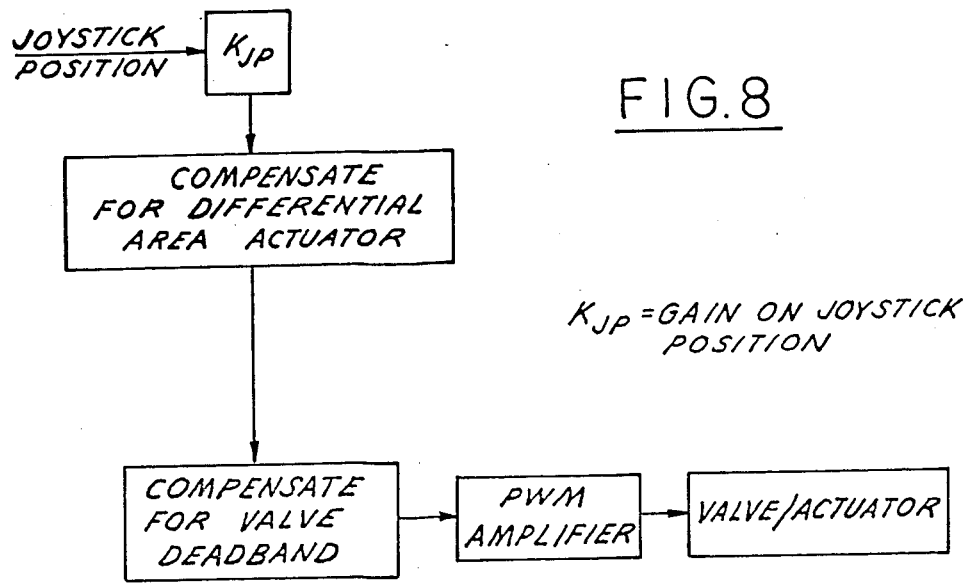
FIG. 8 is a flow chart which illustrates operation of the boom controller in an open-loop mode.
Figure 9:
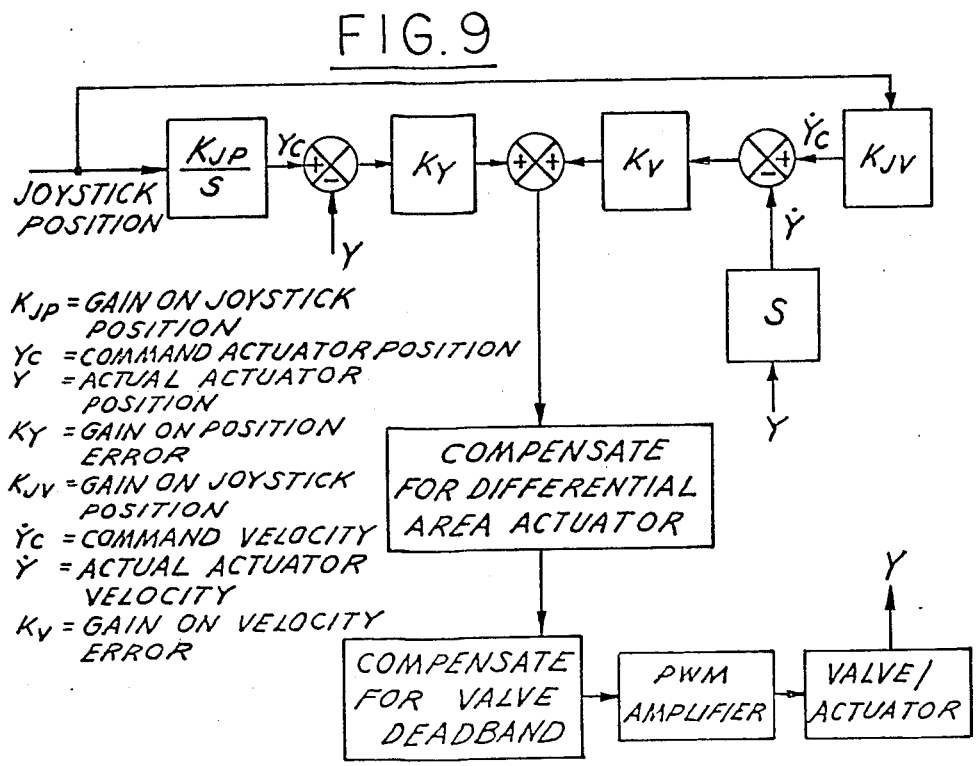
FIG. 9 is a flow chart which illustrates operation of the boom controller in a closed-loop mode.

FIG. 8 is a flow diagram which illustrates operation of boom controller 30B (FIG. 2, or arm controller 32B or bucket controller 34B) in an open-loop mode, and FIG. 9 illustrates operation in a closed loop mode, mode of operation being selectable by the operator and controlled by transmission of data during the second communications frame (Table I), for example. In the open-loop mode (FIG. 8), joystick position previously transmitted and stored in the device controller microprocessor, and indication of desired velocity at the load, is first multiplied by a constant Kjp (which can be varied by the operator via master controller). The control signal is then subjected to compensation for differential area on opposing sides of the actuator piston, and for any deadband in valve operation. A pulse width modulated signal is then transmitted by a power amplifier (76 in FIG. 4) to the servo valve and actuator (30C and 30 in FIG. 4) for obtaining desired motion at the load—i.e. at boom 20 (FIG. 1).

During the closed-loop mode of operation (FIG. 9), the joystick position signal indicative of desired velocity at the boom is first multiplied by constant Kjp and integrated to obtain a corresponding position command signal Yc. The position command signal is compared with the signal Y indicative of actual position at the actuator and load, and the resulting error signal is multiplied by a second constant Ky. At the same time, the position signal Y is differentiated to obtain a signal Y indicative of velocity at the actuator and load, and compared with a velocity command signal Yc derived from input joystick position. The resulting velocity error signal is multiplied by a constant Kv. The two error signals are summed, subjected to compensation as previously described, and thereafter control duty cycle of the pulse width modulated signal transmitted to the servo valve. It will be appreciated, of course, that the control schemes of FIGS. 8 and 9 are strictly exemplary. Other suitable control schemes are illustrated in the following copended applications, all of which are assigned to the assignee hereof: Ser. No. 684,265 filed Dec. 20, 1984, Ser. No. 709,134 filed Mar. 7, 1985, Ser. No. 740,481 filed June 3, 1985 and Ser. No. 765,796 filed Aug. 15, 1985. Hardware suitable for use at any of the device controllers 30B, 32B, 34B and 36A, together with further exemplary programming is illustrated in U.S. Pat. No. 4,502,109 and in copending application Ser. No. 699,039 filed Feb. 7, 1985, both of which are assigned to the assignee hereof. As previously noted, mode of operation and all constants may be varied and downloaded by the operator and/or master controller.

FIG. 10 is a flow chart which illustrates an exemplary scheme for control of pump 36 at pump controller 36A (FIGS. 1, 2 and 5). A flow command signal Qc computed by master based on operator inputs transmitted to the pump controller during the corresponding communications window is divided by actual pump speed N to obtain the displacement Dcf necessary to obtain desired flow Qc. Meanwhile, a speed limit command N1, which is set by the master controller or the operator and downloaded to the pump controller, is compared with actual pump speed N. A lower limit speed command N1 established, for example, to prevent stalling of the pump-drive engine. The resulting difference N1−N is examined to establish a displacement command Dcn based upon pump speed. The two displacement command signals Dcn and Dcf are examined, and the lesser of the two is selected as a displacement command signal Dc. The latter is compared with actual pump displacement D. The difference or error is multiplied by a constant K, subjected to compensation for bias or offset, and then controls duty cycle of a pulse width modulated signal to pump displacement control solenoid 94 (FIG. 5). It will be appreciated, of course, that the pump control scheme illustrated in FIG. 10 is strictly exemplary.

TABLE I

Master Controller/Device Controller Serial Communication Protocol

Frame 1 - Master to Device
| | | | | | | | | |
|---|---|---|---|---|---|---|---|---|
| Byte 1 | 1 | P1 | P2 | P3 | U | U | A | A | A |
| Byte 2 | 0 | D | D | D | D | D | D | D | D |
| Byte 3 | 0 | D | D | D | D | D | D | D | D |

Frame 2 - Master to Device
| | | | | | | | | |
|---|---|---|---|---|---|---|---|---|
| Byte 1 | 0 | P1 | P2 | P3 | F | F | F | F | F |
| Byte 2 | 0 | D | D | D | D | D | D | D | D |
| Byte 3 | 0 | D | D | D | D | D | D | D | D |

Frame 3 - Device to Master
| | | | | | | | | |
|---|---|---|---|---|---|---|---|---|
| Byte 1 | 1 | P1 | P2 | P3 | P | P | P | P | P |
| Byte 2 | 0 | D | D | D | D | D | D | D | D |
| Byte 3 | 0 | D | D | D | D | D | D | D | D |

Frame 4 - Device to Master
| | | | | | | | | |
|---|---|---|---|---|---|---|---|---|
| Byte 1 | 0 | P1 | P2 | P3 | P | P | P | P | P |
| Byte 2 | 0 | D | D | D | D | D | D | D | D |
| Byte 3 | 0 | D | D | D | D | D | D | D | D |

Where
P1 = parity bit of byte 1
P2 = parity bit of byte 2
P3 = parity bit of byte 3
U = unused
A = device address bit
D = data bit
F = used to define data storage address at device
P = used to define data storage address at master

APPENDIX A

MASTER SOFTWARE FOR CONTROLLING SYSTEM TIMING

```
MCS-51 MACRO ASSEMBLER

ISIS-II MCS-51 MACRO ASSEMBLER V1.0
OBJECT MODULE PLACED IN :F2:EXMS6.HEX
ASSEMBLER INVOKED BY:  ASM51 :F2:EXMS6.SA

LOC  OBJ         LINE    SOURCE

1     $NOLIST
                 118     ;
                 119     ;PROGRAM ORIGIN
0000             120     ;
0000 21AC        121             ORG     00H
                 122             AJMP    MAIN            ;JUMP TO MAIN PROGRAM
                 123     ;
                 124     ;***************************************************
                 125     ;
                 126     ;INTERRUPT VECTOR SPACE
001B             127     ;
                 128             ORG     1BH
                 129                                     ;INTERRUPT 1 (INTERNAL) SERVICE ROUTINE
001B 0125        130             AJMP    INT1I           ;FOR CONTROLLING SYSTEM TIMING.
                 131     ;
0023             132             ORG     23H
                 133                                     ;SERIAL INTERRUPT FOR COMMUNICATION TO
0023 015D        134             AJMP    INTS            ;ALL AXES
                 135     ;
                 136     ;***************************************************
                 137     ;
                 138     ;INT1I INTERRUPT 1 (INT.) SERVICE ROUTINE FOR CONTROLLING SYSTEM TIMING
                 139     ;
0025 0525        140     INT1I:  INC     SEQCTR          ;INCREMENT THE SEQUENCE COUNTER
0027 532507      141             ANL     SEQCTR,#07H     ;LIMIT SEQCTR TO 7 AXES
002A C083        142             PUSH    DPH
002C C082        143             PUSH    DPL
002E C0E0        144             PUSH    ACC
0030 C0D0        145             PUSH    PSW
0032 C28E        146             CLR     TR1             ;STOP TIMER
0034 85408D      147             MOV     TH1,TIMEAH
0037 85418B      148             MOV     TL1,TIMEAL
003A C214        149             CLR     FLAG2.4
003C E525        150             MOV     A,SEQCTR
003E 7008        151             JNZ     INT1I1          ;JUMP IF NOT AXIS #0
0040 853E8D      152             MOV     TH1,TIMEEH
0043 853F8B      153             MOV     TL1,TIMEEL
0046 800B        154             SJMP    INT1I2
0048 B40708      155     INT1I1: CJNE    A,#07H,INT1I2
004B 85428D      156             MOV     TH1,TIMEPH
004E 85438B      157             MOV     TL1,TIMEPL
0051 D214        158             SETB    FLAG2.4
0053 D28E        159     INT1I2: SETB    TR1
0055 9001BF      160             MOV     DPTR,#JMPPTR
0058 C082        161             PUSH    DPL
005A C083        162             PUSH    DPH
005C 32          163             RETI
                 164     ;
                 165     ;***************************************************
                 166 +1  $NOLIST
```

MCS-51 MACRO ASSEMBLER

```
LOC   OBJ      LINE    SOURCE

356     ;MAIN    MAIN PROGRAM
               357     ;
01AC  2106     358     MAIN:   AJMP    INIT
01AE  100002   359     MAIN1:  JBC     FLAG0.0,MAIN2
01B1  21AE     360             AJMP    MAIN1
01B3  B201     361     MAIN2:  CPL     FLAG0.1
01B5  2001F6   362             JB      FLAG0.1,MAIN1
01B8  200BF3   363             JB      FLAG1.3,MAIN1   ;JUMP IF DISPLAY NOT CONNECTED
01BB  912F     364             ACALL   EXLCD           ;USE LCD FOR DISPLAY
01BD  21AE     365             AJMP    MAIN1
               366     ;
               367     ;************************************************************
               368     ;
               369     ;JMPPTR   JUMP POINTER ROUTINE (DIRECTS EXECUTION OF PROGRAM)
               370     ;
01BF  E525     371     JMPPTR: MOV     A,SEQCTR
01C1  23       372             RL      A               ;MULT. SEQCTR BY 2
01C2  9001C6   373             MOV     DPTR,#JMPTBL    ;JUMP TABLE (JMPTBL) DIRECTS EXECUTION
01C5  73       374             JMP     @A+DPTR
               375     ;
01C6  2106     376     JMPTBL: AJMP    AXIS0
01C8  413A     377             AJMP    AXIS1
01CA  4159     378             AJMP    AXIS2
01CC  4178     379             AJMP    AXIS3
01CE  4188     380             AJMP    AXIS4
01D0  4198     381             AJMP    AXIS5
01D2  41A8     382             AJMP    AXIS6
01D4  41BA     383             AJMP    AXIS7
               384     ;
               385     ;************************************************************
               386     ;
               387     ;==========================================================
01D6  300412   388     AXIS0:  JNB     FLAG0.4,AXIS0A  ;REG. INIT. ROUTINE THRU SER. PORT
01D9  10051F   389             JBC     FLAG0.5,AXIS0D  ;DELAYS INC. OF APTR
01DC  0515     390             INC     FPTR
01DE  E515     391             MOV     A,FPTR
01E0  B41C18   392             CJNE    A,#1CH,AXIS0D
01E3  751500   393             MOV     FPTR,#00H
01E6  C204     394             CLR     FLAG0.4         ;TERMINATES THIS INIT. ROUTINE
01E8  751400   395             MOV     APTR,#00H
               396     ;==========================================================
01EB  B1BE     397     AXIS0A: ACALL   SWLCD           ;EXECUTE SWITCH ROUTINE
01ED  D200     398             SETB    FLAG0.0         ;INITIATES DSPLY IN BACKGROUND
01EF  101302   399             JBC     FLAG2.3,AXIS0B  ;CHECK IF XICOR MEMORY TO BE RELOADED
01F2  21FB     400             AJMP    AXIS0D
01F4  904000   401     AXIS0B: MOV     DPTR,#04000H    ;TOGGLE STORE PIN ON XICORS
01F7  F0       402             MOVX    @DPTR,A
01F8  751409   403             MOV     APTR,#09H
01FB  D51205   404     AXIS0D: DJNZ    LEDCNT,AXIS0E   ;BLINK LED
01FE  751220   405             MOV     LEDCNT,#20H
0201  B2B4     406             CPL     P3.4
0203  753C00   407     AXIS0E: MOV     FLOWPM,#00H
0206  753D00   408             MOV     FLOWPL,#00H
               409     ;
0209  300403   410             JNB     FLAG0.4,AXIS00  ;FLAG0.4=1 DURING INIT. OF AXIS REG'S
020C  751400   411             MOV     APTR,#00H
020F  51DC     412     AXIS00: ACALL   SERPOT          ;OUTPUT ADDR.,POTIO,POTUD
0211  7106     413             ACALL   SERCON
0213  C0F0     414             PUSH    B
0215  7405     415             MOV     A,#05H          ;SEND BOOM POSITION
0217  75F01B   416             MOV     B,#1BH          ;PUT DATA IN LOCATION 1B
021A  713B     417             ACALL   SERBYT          ;SEND DATA
021C  7406     418             MOV     A,#06H          ;SEND ARM POSITION
021E  75F01A   419             MOV     B,#1AH          ;PUT DATA IN LOCATION 1A
0221  713B     420             ACALL   SERBYT
0223  D0F0     421             POP     B
0225  303906   422             JNB     FLAG.1,AXIS01
0228  7400     423             MOV     A,#00H          ;READ POSITION AT LOCATION 0 OF FEEDBACK TABLE
022A  71B6     424             ACALL   AUTOPT          ;LOAD POSITION INTO POT AND SEROPT REGISTERS
022C  41D3     425             AJMP    AXIRET
022E  7401     426     AXIS01: MOV     A,#01H          ;READ POTS 0 AND 1 FOR AXIS 1
0230  717F     427             ACALL   POT2C           ;READ POTS
0232  740C     428             MOV     A,#0CH          ;READ CHANNEL C FOR AXIS 1 (OPTIONAL)
0234  716D     429             ACALL   POTB
0236  F519     430             MOV     SEROPT,A
0238  41D3     431             AJMP    AXIRET
               432     ;
023A  300403   433     AXIS1:  JNB     FLAG0.4,AXIS1B  ;FLAG0.4=1 DURING INIT. OF AXIS REG'S
023D  751401   434             MOV     APTR,#01H
0240  51DC     435     AXIS1B: ACALL   SERPOT          ;OUTPUT ADDR.,POT1,POT2 ON SERIAL LINK
0242  7106     436             ACALL   SERCON          ;OUTPUT FPTR,SERBT2,SERBT3 ON SER. LINK
```

```
0244 303906        437              JNB     FLAG.1,AXIS1C   ;READ POS. DATA AT LOCATION 01 IN FDBK TABLE
0247 7401          438              MOV     A,#01H          ;LOAD POSITION INTO POT AND SEROPT REG'S
0249 71B6          439              ACALL   AUTOPT
024B 41D3          440              AJMP    AXIRET
024D 7423          441    AXIS1C:   MOV     A,#23H          ;READ POTS 2 AND 3 FOR AXIS 2
024F 717F          442              ACALL   POT2C           ;READ POTS
0251 740D          443              MOV     A,#0DH          ;READ POT 0DH
0253 716D          444              ACALL   POTB
0255 F519          445              MOV     SEROPT,A
0257 41D3          446              AJMP    AXIRET
                   447      ;
0259 300403        448    AXIS2:    JNB     FLAG0.4,AXIS2B  ;FLAG0.4=1 DURING INIT. OF AXIS REG'S
025C 751402        449              MOV     APTR,#02H
025F 51DC          450    AXIS2B:   ACALL   SERPOT          ;OUTPUT ADDR.,POT1,POT2 ON SERIAL LINK
0261 7106          451              ACALL   SERCON          ;OUTPUT FPTR,SERBT2,SERBT3 ON SER. LINK
0263 303906        452              JNB     FLAG.1,AXIS2C
0266 7402          453              MOV     A,#02
0268 71B6          454              ACALL   AUTOPT
026A 41D3          455              AJMP    AXIRET
026C 7445          456    AXIS2C:   MOV     A,#45H          ;READ POTS 4 AND 5 FOR AXIS 3
026E 717F          457              ACALL   POT2C           ;READ POTS
0270 740E          458              MOV     A,#0EH          ;READ POT 0EH
0272 716D          459              ACALL   POTB
0274 F519          460              MOV     SEROPT,A
0276 41D3          461              AJMP    AXIRET
                   462      ;
0278 300403        463    AXIS3:    JNB     FLAG0.4,AXIS3B  ;FLAG0.4=1 DURING INIT. OF AXIS REG'S
027B 751403        464              MOV     APTR,#03H
027E 51DC          465    AXIS3B:   ACALL   SERPOT          ;OUTPUT ADDR.,POT1,POT2 ON SERIAL LINK
```

MCS-51 MACRO ASSEMBLER

```
LOC  OBJ           LINE     SOURCE 0280 7106          466              ACALL   SERCON          ;OUTPUT FPTR,SERBT2,SERBT3 ON SER. LINK
0282 7467          467              MOV     A,#67H          ;READ POTS 6 AND 7 FOR AXIS 4
0284 717F          468              ACALL   POT2C           ;READ POTS
0286 41D3          469              AJMP    AXIRET
                   470      ;
0288 300403        471    AXIS4:    JNB     FLAG0.4,AXIS4B  ;FLAG0.4=1 DURING INIT. OF AXIS REG'S
028B 751404        472              MOV     APTR,#04H
028E 51DC          473    AXIS4B:   ACALL   SERPOT          ;OUTPUT ADDR.,POT1,POT2 ON SERIAL LINK
0290 7106          474              ACALL   SERCON          ;OUTPUT FPTR,SERBT2,SERBT3 ON SER. LINK
0292 7489          475              MOV     A,#89H          ;READ POTS 8 AND 9 FOR AXIS 5
0294 717F          476              ACALL   POT2C           ;READ POTS
0296 41D3          477              AJMP    AXIRET
                   478      ;
0298 300403        479    AXIS5:    JNB     FLAG0.4,AXIS5B  ;FLAG0.4=1 DURING INIT. OF AXIS REG'S
029B 751405        480              MOV     APTR,#05H
029E 51DC          481    AXIS5B:   ACALL   SERPOT          ;OUTPUT ADDR.,POT1,POT2 ON SERIAL LINK
02A0 7106          482              ACALL   SERCON          ;OUTPUT FPTR,SERBT2,SERBT3 ON SER. LINK
02A2 74AB          483              MOV     A,#0ABH         ;READ POTS A AND B FOR AXIS 6
02A4 717F          484              ACALL   POT2C           ;READ POTS
02A6 41D3          485              AJMP    AXIRET
                   486      ;
02A8 300403        487    AXIS6:    JNB     FLAG0.4,AXIS6B  ;FLAG0.4=1 DURING INIT. OF AXIS REG'S
02AB 751406        488              MOV     APTR,#06H
02AE 51DC          489    AXIS6B:   ACALL   SERPOT          ;OUTPUT ADDR.,POT1,POT2 ON SERIAL LINK
02B0 7106          490              ACALL   SERCON          ;OUTPUT FPTR,SERBT2,SERBT3 ON SER. LINK
02B2 853C18        491              MOV     POT,FLOWPM
02B5 853D19        492              MOV     SEROPT,FLOWPL
02B8 41D3          493              AJMP    AXIRET
                   494      ;
02BA 300403        495    AXIS7:    JNB     FLAG0.4,AXIS7A  ;FLAG0.4=1 DURING INIT. OF AXIS REG'S
02BD 751407        496              MOV     APTR,#07H
02C0 51DC          497    AXIS7A:   ACALL   SERPOT          ;OUTPUT ADDR.,FLOWPM,FLOWPL ON SERIAL LINK
02C2 7106          498              ACALL   SERCON          ;OUTPUT FPTR,SERBT2,SERBT3 ON SER. LINK
02C4 120D24        499              LCALL   DACOUT          ;OUTPUT DATA FOR SCOPE ON 12 BIT DAC
02C7 7423          500              MOV     A,#23H          ;READ POTS 2 AND 3 FOR EXEXT AXIS
02C9 717F          501              ACALL   POT2C
02CB F519          502              MOV     SEROPT,A
02CD 7401          503              MOV     A,#01H          ;READ POTS 0 AND 1 FOR EXEXT AXIS
02CF 717F          504              ACALL   POT2C
02D1 41D3          505              AJMP    AXIRET
                   506      ;
                   507      ;***************************************************************
                   508      ;
02D3 D0D0          509    AXIRET:   POP     PSW
02D5 D0E0          510              POP     ACC
02D7 D082          511              POP     DPL
02D9 D083          512              POP     DPH
02DB 22            513              RET
                   514
                   515      ;***************************************************************
                   516 +1   $NOLIST
```

ASSEMBLY COMPLETE, NO ERRORS FOUND

APPENDIX B

MCS-51 MACRO ASSEMBLER

ISIS-II MCS-51 MACRO ASSEMBLER V1.0
OBJECT MODULE PLACED IN :F2:EXMS6.HEX
ASSEMBLER INVOKED BY: ASM51 :F2:EXMS6.SA

*MASTER SOFTWARE FOR SERIAL COMMUNICATION*

```
LOC   OBJ          LINE    SOURCE

1       $NOLIST
                   166     ;INTS   SERIAL INTERRUPT ROUTINE
                   167     ;
                   168     ;       (XMIT DESCRIPTION)
                   169     ; INITIAL VALUES      BITS SENT      FINAL VALUES        DESCRIPTION
                   170     ;
                   171     ;TB8    FLAG1     TB8   BYTE NAME   TB8    FLAG1
                   172     ; X    XXXXXX00    0    SERBT2       0    XXXXXX01   CLEARS TB8, SENDS SERBT2
                   173     ; B    XXXXXX01    B    SERBT3       B    XXXXXX10   SENDS SERBT3 & BIT IN TB8
                   174     ; X    XXXXXX10    -    ------       X    XXXXX100   ALL BYTES SENT, RETURN
                   175     ;
0050 102204        176     INTS:   JBC    TI,INTS0        ;T1=1 IF LAST TRANS. COMPLETE
0060 C298          177             CLR    RI              ;RI=1 IF RECEPTION COMPLETE
0062 0137          178             AJMP   INTS4
0064 10091D        179     INTS0:  JBC    FLAG1.1,INTS3   ;FLAG1.1=1 IF ALL BYTES SENT
0067 301409        180             JNB    FLAG2.4,INTS1
006A C0E0          181             PUSH   ACC
006C E52C          182             MOV    A,PDELAY
006E 14            183     INTS00: DEC    A
006F 70FD          184             JNZ    INTS00
0071 D0E0          185             POP    ACC
0073 200808        186     INTS1:  JB     FLAG1.0,INTS2   ;FLAG1.0=1 IF SERBT3 TO BE SENT
0076 C29B          187             CLR    TB8             ;TB8 IS SET ONLY FOR ADDRESS BYTE
0078 0521          188             INC    FLAG1           ;FLAG1 KEEPS TRACK OF LAST BYTE SENT
007A 851099        189             MOV    SBUF,SERBT2     ;SEND SERBT2
007D 32            190             RETI
007E 0521          191     INTS2:  INC    FLAG1           ;FLAG1 KEEPS TRACK OF LAST BYTE SENT
0080 851199        192             MOV    SBUF,SERBT3     ;SEND SERBT2 BYTE
0083 32            193             RETI
0084 D20A          194     INTS3:  SETB   FLAG1.2         ;FLAG1.2 =1 IF ALL 3 BYTES SENT
0086 32            195             RETI
0087 C0E0          196     INTS4:  PUSH   ACC             ;SAVE ACC AND PSW
0089 C0D0          197             PUSH   PSW
008B 302A11        198             JNB    RB8,INTS5       ;JUMP IF NOT 1ST BYT REC'D
008E E599          199             MOV    A,SBUF          ;#1 BYTE REC'D (POINTER BYTE)
0090 F51B          200             MOV    SERF1,A         ;SAVE #1 BYTE IN SERF1
0092 541F          201             ANL    A,#1FH          ;DROP PARITY BITS
0094 A2D0          202             MOV    C,P
0096 920F          203             MOV    FLAG1.7,C       ;SAVE PARITY OF #1 BYTE IN FLAG1.7
0098 C20C          204             CLR    FLAG1.4         ;NEXT BYTE REC'D IS #2
009A D0D0          205             POP    PSW
009C D0E0          206             POP    ACC
009E 32            207             RETI
009F 10C0F         208     INTS5:  JBC    FLAG1.4,INTS6   ;JUMP TO RECEIVE #3 BYTE
00A2 E599          209             MOV    A,SBUF          ;#2 BYTE REC'D
00A4 A2D0          210             MOV    C,P
00A6 920E          211             MOV    FLAG1.6,C       ;SAVE PARITY OF #2 BYTE IN FLAG1.6
00A8 F51C          212             MOV    SERF2,A
00AA D20C          213             SETB   FLAG1.4         ;INDICATES NEXT BYTE IS #3
00AC D0D0          214             POP    PSW
00AE D0E0          215             POP    ACC
00B0 32            216             RETI
00B1 E599          217     INTS6:  MOV    A,SBUF          ;#3 BYTE REC'D
00B3 A2D0          218             MOV    C,P
00B5 920D          219             MOV    FLAG1.5,C       ;SAVE PARITY OF #3 BYTE IN FLAG1.5
00B7 F51D          220             MOV    SERF3,A
00B9 E51B          221             MOV    A,SERF1         ;GET BYTE #1
00BB 6521          222             XRL    A,FLAG1         ;CHECK PARITY OF ALL THREE BYTES
00BD 54E0          223             ANL    A,#0E0H         ;DROP ALL BUT PARITY BITS
00BF 703E          224             JNZ    INTS9           ;JUMP IF PARITY IS BAD
00C1 E51B          225             MOV    A,SERF1         ;FIND WHERE TO PUT DATA
00C3 541F          226             ANL    A,#1FH          ;DROP PARITY BITS
00C5 B41F15        227             CJNE   A,#1FH,INTS8
00C8 E53D          228             MOV    A,FLOWPL
00CA 251D          229             ADD    A,SERF3
00CC F53D          230             MOV    FLOWPL,A
00CE E51C          231             MOV    A,SERF2
00D0 353C          232             ADDC   A,FLOWPM
00D2 5005          233             JNC    INTS7           ;JUMP IF OVERFLOW DID NOT OCCUR
00D4 753DFF        234             MOV    FLOWPL,#0FFH
00D7 74FF          235             MOV    A,#0FFH
00D9 F53C          236     INTS7:  MOV    FLOWPM,A
00DB 8024          237             SJMP   INTSA
00DD 23            238     INTS8:  RL     A
00DE C083          239             PUSH   DPH
00E0 C082          240             PUSH   DPL
00E2 9021C0        241             MOV    DPTR,#FDBTBL-AXSTRT+2000H ;START OF FEEDBACK TABLE
00E5 2582          242             ADD    A,DPL
00E7 F582          243             MOV    DPL,A
00E9 E583          244             MOV    A,DPH
00EB 3400          245             ADDC   A,#00H
00ED F583          246             MOV    DPH,A
00EF E51C          247             MOV    A,SERF2         ;GET THE FIRST DATA BYTE
00F1 F0            248             MOVX   @DPTR,A
```

```
00F2 A3              249            INC     DPTR
00F3 E51D            250            MOV     A,SERF3
00F5 F0              251            MOVX    @DPTR,A
00F6 D082            252            POP     DPL
00F8 D083            253            POP     DPH
00FA D0D0            254            POP     PSW
00FC D0E0            255            POP     ACC
00FE 32              256            RETI
00FF 0523            257    INTS9:  INC     PERROR
0101 D0D0            258    INTSA:  POP     PSW
0103 D0E0            259            POP     ACC
0105 32              260            RETI
                     261    ;
                     262    ;****************************************************************
                     263 +1 $NOLIST
                     516    ;
                     517 +1 $IC(:F2:SERPOT.SA)
                =1   518    ;SERPOT ROUTINE FOR LOADING ADDR. AND POT VALUES FOR SERIAL OUTPUT
                =1   519    ;
                =1   520    ;   THIS ROUTINE LOADS THE FOLLOWING REGISTERS:
                =1   521    ;
                =1   522    ;TB8        SBUF              TB8   SERBT2    TB8   SERBT3
                =1   523    ; 1  P1 P2 P3   AUT ADDR.     0     POT       0     SEROPT
                =1   524    ; _  _  _  _    _   ___       _     _____  _     _____
                =1   525    ;   /    1ST BYTE    /            /2ND BYTE/       /3RD BYTE/
                =1   526    ;
                =1   527    ;REGISTERS USED: A,POT,SEROPT,SERBT2,SERBT3,SEQCTR,SBUF
                =1   528    ;BITS USED: C,P,FLAG0.2,FLAG0.3
                =1   529    ;EXECUTION TIME:
                =1   530    ;
02DC E518       =1   531    SERPOT: MOV     A,POT
02DE A2D0       =1   532            MOV     C,P              ;PARITY OF POT1 IS IN FLAG0.2
02E0 9202       =1   533            MOV     FLAG0.2,C
02E2 F510       =1   534            MOV     SERBT2,A         ;LOAD POT1 INTO SERBT2
02E4 E519       =1   535            MOV     A,SEROPT
02E6 A2D0       =1   536            MOV     C,P
02E8 9203       =1   537            MOV     FLAG0.3,C        ;PARITY OF SEROPT IS IN FLAG0.3
02EA F511       =1   538            MOV     SERBT3,A         ;LOAD SEROPT INTO SERBT3
02EC E525       =1   539            MOV     A,SEQCTR         ;ADDR. IS IN BITS SEQCTR.0,.1,.2
02EE A2D0       =1   540            MOV     C,P
02F0 92E7       =1   541            MOV     ACC.7,C          ;PARITY OF ADDRESS IS IN ACC.7
02F2 A239       =1   542            MOV     C,FLAG.1
02F4 92E3       =1   543            MOV     ACC.3,C
02F6 A202       =1   544            MOV     C,FLAG0.2
02F8 92E6       =1   545            MOV     ACC.6,C          ;PARITY OF POT IS IN ACC.6
02FA A203       =1   546            MOV     C,FLAG0.3
02FC 92E5       =1   547            MOV     ACC.5,C          ;PARITY OF SEROPT IS IN ACC.5
02FE D29B       =1   548            SETB    TB8              ;SET ADDRESS BIT
0300 5321F8     =1   549            ANL     FLAG1,#0F8H      ;CLEAR FLAG1.0,FLAG1.1,FLAG1.2
0303 F599       =1   550            MOV     SBUF,A           ;START OUTPUT OF THREE BYTES
0305 22         =1   551            RET
                     552    ;
                     553    ;****************************************************************
                     554    ;
                     555 +1 $IC(:F2:SERCON.SA)
                =1   556    ;
                =1   557    ;SERCON  ROUTINE FOR LOADING FPTR,CONST1,CONST2 FOR SERIAL OUTPUT
                =1   558    ;
                =1   559    ;   THIS ROUTINE LOADS THE ACC., SERBT2, SERBT3 FOR SERIAL OUTPUT.
                =1   560    ;THE REGISTERS ARE SET UP AS FOLLOWS:
                =1   561    ;
                =1   562    ;TB8        ACC.              TB8   SERBT2    TB8   SERBT3
                =1   563    ; 0  P1 P2 P3 FPTR            0     CONST1    0     CONST2
                =1   564    ; _  _  _  _  ____            _     _____  _     _____
                =1   565    ;   /    1ST BYTE    /            /2ND BYTE /      /3RD BYTE/
                =1   566    ;
                =1   567    ;REGISTERS USED: ACC.,SEQCTR,APTR,FPTR,B,SERBT2,SERBT3,DPTR
                =1   568    ;ROUTINES CALLED: FETCH
                =1   569    ;BITS USED: P,C,FLAG1.2,FLAG0.2,FLAG0.3
                =1   570    ;EXECUTION TIME:
                =1   571    ;
0306 E525       =1   572    SERCON: MOV     A,SEQCTR         ;SEQCTR= 00000AAA (AAA=AXIS #)
0308 B5142F     =1   573            CJNE    A,APTR,SERCO2    ;JUMP IF SEQCTR .NE. APTR
030B C000       =1   574            PUSH    00H
030D C0F0       =1   575            PUSH    B                ;SAVE CONTENTS OF B REG.
030F B136       =1   576            ACALL   FETCH            ;GET CONST1 AND CONST2 (R0,A RESPECTIVELY)

0311 D0F0       =1   577            POP     B
0313 300AFD     =1   578    SERCO1: JNB     FLAG1.2,SERCO1   ;WAIT LOOP UNTIL PREVIOUS 3 BYTES SENT
0316 A2D0       =1   579            MOV     C,P              ;PARITY OF SERBT3 IN FLAG0.2
0318 9202       =1   580            MOV     FLAG0.2,C
031A F511       =1   581            MOV     SERBT3,A         ;LOAD CONST2 INTO SERBT3
031C E8         =1   582            MOV     A,R0             ;PUT CONST1 INTO ACC.
031D D000       =1   583            POP     00H
031F A2D0       =1   584            MOV     C,P              ;PARITY OF SERBT2 IN FLAG0.3
0321 9203       =1   585            MOV     FLAG0.3,C
0323 F510       =1   586            MOV     SERBT2,A         ;LOAD CONST1 INTO SERBT2
0325 E515       =1   587            MOV     A,FPTR           ;FPTR DEFINES WHERE CONSTANTS ARE
                =1   588                                     ;TO BE PUT IN AXIS DATA MEMORY
```

```
0327 A2D0     =1  589            MOV     C,P
0329 92E7     =1  590            MOV     ACC.7,C         ;PARITY OF FPTR IN ACC.7
032B A203     =1  591            MOV     C,FLAG0.3
032D 92E6     =1  592            MOV     ACC.6,C         ;PARITY OF SERBT2 IN ACC.6
032F A202     =1  593            MOV     C,FLAG0.2       ;PARITY OF SERBT3 IN ACC.5
0331 92E5     =1  594            MOV     ACC.5,C
0333 C29B     =1  595            CLR     TB8             ;THIS IS NOT AN ADDRESS BYTE
0335 5321F8   =1  596            ANL     FLAG1,#0F8H     ;CLEAR FLAG1.0,FLAG1.1,FLAG1.2
0338 F599     =1  597            MOV     SBUF,A          ;START OUTPUT OF THREE BYTES
033A 22       =1  598  SERC02:   RET
                  599  ;
                  600  ;*****************************************************
                  601  ;
                  602 +1 $IC(:F2:SERBYT.SA)
              =1  603  ;SERBYT ROUTINE FOR TRANSMITTING SERIAL DATA FROM FDBK TABLE TO AXIS
              =1  604  ;
              =1  605  ;INITIALLY:
              =1  606  ;   A = LOCATION OF FIRST BYTE OF DATA IN FDBK TABLE (00 TO 1BH)
              =1  607  ;   B = LOCATION WHERE FIRST BYTE IS GOING IN AXIS (00 TO 1B)
              =1  608  ;THREE BYTES ARE TRANSMITTED:
              =1  609  ;BYTE #1: ADDRESS BYTE: P1 P2 P3 ADDRESS
              =1  610  ;BYTE #2: DATA BYTE:    --------
              =1  611  ;BYTE #3: DATA BYTE:    --------
              =1  612  ;
033B 9021C0   =1  613  SERBYT:   MOV     DPTR,#FDBTBL-AXSTRT+2000H  ;LOCATE START OF FEEDBACK TBL
033E 23       =1  614            RL      A
033F 2582     =1  615            ADD     A,DPL           ;FIND ADDRESS OF DATA TO BE TRANSMITTED
0341 F582     =1  616            MOV     DPL,A
0343 E583     =1  617            MOV     A,DPH
0345 3400     =1  618            ADDC    A,#00H
0347 F583     =1  619            MOV     DPH,A
0349 300AFD   =1  620  SERBY1:   JNB     FLAG1.2,SERBY1  ;WAIT FOR LAST THREE BYTES TO BE SENT
034C E0       =1  621            MOVX    A,@DPTR
034D A2D0     =1  622            MOV     C,P
034F 92F6     =1  623            MOV     B.6,C
0351 F510     =1  624            MOV     SERBT2,A
0353 A3       =1  625            INC     DPTR
0354 E0       =1  626            MOVX    A,@DPTR
0355 A2D0     =1  627            MOV     C,P
0357 92F5     =1  628            MOV     B.5,C
0359 F511     =1  629            MOV     SERBT3,A
035B E5F0     =1  630            MOV     A,B
035D 541F     =1  631            ANL     A,#1FH
035F A2D0     =1  632            MOV     C,P
0361 E5F0     =1  633            MOV     A,B
0363 92E7     =1  634            MOV     ACC.7,C
0365 C29B     =1  635            CLR     TB8             ;THIS IS NOT AN ADDRESS WORD
0367 5321F8   =1  636            ANL     FLAG1,#0F8H     ;CLEAR BITS FLAG1.0,1,2
036A F599     =1  637            MOV     SBUF,A
036C 22       =1  638            RET
                  639  ;
                  640 +1 $NOLIST
```

ASSEMBLY COMPLETE, NO ERRORS FOUND
MCS-51 MACRO ASSEMBLER

ISIS-II MCS-51 MACRO ASSEMBLER V1.0
OBJECT MODULE PLACED IN :F2:EXAX6.HEX
ASSEMBLER INVOKED BY: ASM51 :F2:EXAX6.SA

```
LOC  OBJ        LINE   SOURCE

1    $NOLIST
                256    ;
                257    ;*****************************************************
                258    ;INTS    SERIAL INTERRUPT ROUTINE
                259    ;
00C7 109805     260    INTS:   JBC     RI,INTS1        ;RI=1 IF RECEPTION COMPLETE
00CA C299       261            CLR     TI              ;TI=1 IF LAST TRANS. COMPLETE
00CC 2180       262            AJMP    INTSB           ;TRANS. #2 AND # 3 BYTES BACK TO MASTER
00CE 32         263            RETI
00CF C0E0       264    INTS1:  PUSH    ACC             ;SAVE ACC AND PSW IN STACK
00D1 C0D0       265            PUSH    PSW
00D3 30CA25     266            JNB     RB8,INTS4       ;RB8=1 IF AN ADDR. BYTE WAS REC'D
00D6 E599       267            MOV     A,SBUF          ;PUT ADDR. BYTE IN ACC.
00D8 F50B       268            MOV     SERBT1,A        ;SAVE ADDR. BYTE IN SERBT1
00DA 5407       269            ANL     A,#07H          ;CLEAR ALL BUT BITS 0,1,AND 2
00DC D20D       270            SETB    FLAG1.5         ;INDICATES SERIAL LINE OK (SAFETY BIT)
00DE B50813     271            CJNE    A,AXIS,INTS3    ;CHECK IF ADDR. REC'D=AXIS
00E1 A2D0       272            MOV     C,P
00E3 9207       273            MOV     FLAG0.7,C       ;PUT PARITY OF #1 BYTE IN BIT 7 OF FLAG0
00E5 C29D       274            CLR     SM2             ;LISTEN TO ALL FOLLOWING BYTES
00E7 E50B       275            MOV     A,SERBT1
00E9 A2E3       276            MOV     C,ACC.3
00EB 923D       277            MOV     FLAG4.5,C       ;FLAG4.5=1 FOR COORDINATED JOINT MOTION
00ED 5320F8     278            ANL     FLAG0,#0F8H     ;CLEAR BITS FLAG0.0,1,2
```

```
00F0 2198        279            AJMP   INTSE              ;START SENDING BACK DATA
00F2 0526        280   INTS25:  INC    PERROR             ;INC PERROR IF POT PARITY IS WRONG
00F4 D29D        281   INTS3:   SETB   SM2                ;LISTEN ONLY FOR ADDR. BYTES
00F6 D0D0        282            POP    PSW
00F8 D0E0        283            POP    ACC
00FA 32          284            RETI
00FB 200034      285   INTS4:   JB     FLAG0.0,INTS6      ;JUMP IF BYTE IS FROM CONSTANT SET
00FE 20020F      286            JB     FLAG0.2,INTS5      ;JUMP IF BYTE IS 3RD OF AXIS SET
0101 E599        287   INTS45:  MOV    A,SBUF             ;BYTE IS 2ND OF AXIS SET (POT1)
0103 A2D0        288            MOV    C,P
0105 9206        289            MOV    FLAG0.6,C          ;PUT PARITY OF #2 BYTE IN FLAG0.6
0107 F50C        290            MOV    SERBT2,A           ;STORE 2ND BYTE IN SERBT2
0109 D202        291            SETB   FLAG0.2            ;FLAG0.2=1 FOR THE 3RD BYTE REC'D
010B D0D0        292            POP    PSW
010D D0E0        293            POP    ACC
010F 32          294            RETI
0110 E599        295   INTS5:   MOV    A,SBUF             ;BYTE IS 3RD OF AXIS SET (POT2)
0112 A2D0        296            MOV    C,P
0114 9205        297            MOV    FLAG0.5,C          ;PUT PARITY OF #3 BYTE IN FLAG0.5
0116 F50D        298            MOV    SERBT3,A           ;STORE 3RD BYTE IN SERBT3
0118 E50B        299            MOV    A,SERBT1           ;PERFORM PARITY CHECK OF ALL 3 BYTES
011A 6520        300            XRL    A,FLAG0
011C 54E0        301            ANL    A,#0E0H            ;CLEAR ALL BUT BITS 5,6, AND 7
011E 70D2        302            JNZ    INTS25             ;JUMP IF PARITY IS BAD FOR ANY OF 3 BYTES
0120 850C09      303            MOV    POT,SERBT2         ;LOAD POT
0123 850D0A      304            MOV    SEROPT,SERBT3      ;LOAD SEROPT 0126 5320F8      305            ANL    FLAG0,#0F8H        ;CLEAR BITS FLAG0.0,1,2
0129 D200        306            SETB   FLAG0.0            ;INDICATES NEXT BYTE WILL BE 1ST OF CONST. SET
012B D204        307            SETB   FLAG0.4            ;INDICATES POT AND SEROPT ARE LOADED
012D D0D0        308            POP    PSW
012F D0E0        309            POP    ACC
0131 32          310            RETI
0132 200214      311   INTS6:   JB     FLAG0.2,INTS8      ;JUMP IF 3RD OF CONST. SET
0135 2001C9      312            JB     FLAG0.1,INTS45     ;JUMP IF BYTE IS 2ND OF CONST. SET
0138 E599        313            MOV    A,SBUF             ;BYTE IS 1ST OF CONST. SET
013A F50B        314            MOV    SERBT1,A           ;SAVE FPTR AND PARITY BITS
013C 541F        315            ANL    A,#1FH             ;DROP ALL PARITY BITS FROM ACC
013E A2D0        316            MOV    C,P
0140 9207        317            MOV    FLAG0.7,C          ;PUT PARITY OF #1 BYTE IN FLAG0.7
0142 D201        318            SETB   FLAG0.1            ;INDICATES NEXT BYTE WILL BE 2ND OF CONST. SET
0144 D0D0        319            POP    PSW
0146 D0E0        320            POP    ACC
0148 32          321            RETI
0149 E599        322   INTS8:   MOV    A,SBUF             ;BYTE IS 3RD OF CONSTANT SET
014B A2D0        323            MOV    C,P
014D 9205        324            MOV    FLAG0.5,C          ;STORE PARITY OF 3RD BYTE IN FLAG0.5
014F F50D        325            MOV    SERBT3,A           ;STORE 3RD BYTE IN SERBT3
0151 E50B        326            MOV    A,SERBT1           ;TEST PARITY OF ALL 3 BYTES
0153 6520        327            XRL    A,FLAG0
0155 54E0        328            ANL    A,#0E0H            ;CLEAR ALL BUT BITS 5,6, AND 7
0157 7020        329            JNZ    INTSA              ;JUMP IF PARITY IS BAD FOR ANY OF 3 BYTES
0159 E50B        330            MOV    A,SERBT1           ;LOAD DATA MEMORY WITH NEW CONSTANTS
015B 541F        331            ANL    A,#1FH             ;ACC NOW HOLDS FPTR
015D B41B02      332            CJNE   A,#1BH,INTS9       ;CHECK IF ALL REG'S HAVE BEEN INITIALIZED
0160 D203        333            SETB   FLAG0.3            ;BIT=1 WHEN ALL REG.'S LOADED
0162 23          334   INTS9:   RL     A                  ;MULT. FPTR BY 2
0163 242A        335            ADD    A,#2AH             ;FPTR*2+2AH=DATA MEM. LOCATION
0165 C000        336            PUSH   00H                ;SAVE R0
0167 F8          337            MOV    R0,A               ;PUT INDIRECT ADDRESS IN R0
0168 A60C        338            MOV    @R0,SERBT2         ;PUT 1ST CONSTANT IN DATA MEMORY
016A 08          339            INC    R0
016B A60D        340            MOV    @R0,SERBT3         ;PUT 2ND CONSTANT IN DATA MEMORY
016D 5320F8      341            ANL    FLAG0,#0F8H        ;CLEAR BITS FLAG0.0,1,AND 2
0170 D200        342            SETB   FLAG0.0            ;INDICATES NEXT BYTE IS 1ST OF CONSTANT SET
0172 D000        343            POP    00H                ;POP R0
0174 D0D0        344            POP    PSW
0176 D0E0        345            POP    ACC
0178 32          346            RETI
0179 0526        347   INTSA:   INC    PERROR             ;COUNT # OF PARITY ERRORS
017B D0D0        348            POP    PSW
017D D0E0        349            POP    ACC
017F 32          350            RETI
0180 103808      351   INTSB:   JBC    FLAG4.0,INTSC      ;JUMP TO SEND BYTE #2
0183 852999      352            MOV    SBUF,SERF3         ;SEND BYTE #3
0186 D238        353            SETB   FLAG4.0
0188 D239        354            SETB   FLAG4.1
018A 32          355            RETI
018B 103906      356   INTSC:   JBC    FLAG4.1,INTSD      ;JUMP IF LAST BYTE WAS SENT
018E C29B        357            CLR    TB8
0190 852899      358            MOV    SBUF,SERF2         ;SEND BYTE #2
0193 32          359            RETI
0194 C0E0        360   INTSD:   PUSH   ACC                ;SEE IF DATA TO BE SENT TO MASTER
0196 C0D0        361            PUSH   PSW
0198 C083        362   INTSE:   PUSH   DPH
019A C082        363            PUSH   DPL
019C 9004E1      364            MOV    DPTR,#FDBK         ;FDBK IS ADDRESS OF FEEDBACK ROUTINE
019F C082        365            PUSH   DPL
01A1 C083        366            PUSH   DPH
01A3 32          367            RETI
                 368            ;
                 369            ;**********************************************************
                 370 +1         $NOLIST
```

```
                          879    ;
                          880 +1 $IC(:F2:FDBK.SA)
                     =1   881    ;FDBK ROUTINE FOR SEQUENCING FEEDBACK OF DATA TO MASTER
                     =1   882    ;
                     =1   883    ;   EXECUTION IS DIRECTED HERE FROM THE SERIAL INTERRUPT FOLLOWING EITHER
                     =1   884    ;RECEPTION OF A 'CORRECT' ADDRESS BYTE OR THE LAST BYTE OF THREE WAS SENT
                     =1   885    ;TO THE MASTER. THE EXECUTION OF THIS ROUTINE IS CONTROLLED BY A REGISTER
                     =1   886    ;CALLED FBKNUM. THE LOWER 4 BITS HOLD THE NUMBER OF THE WORD TO BE SENT
                     =1   887    ;BACK, THE UPPER NIBBLE HOLDS THE MAXIMUM NUMBER OF WORDS TO BE SENT BACK.
                     =1   888    ;
04E1 E522            =1   889    FDBK:    MOV    A,FLAG3          ;SEE IF MAX # OF WORDS HAS BEEN REACHED
04E3 5407            =1   890             ANL    A,#007H          ;DUMP UPPER 5 BITS
04E5 B52D00          =1   891             CJNE   A,FBKNUM,FDBK0
04E8 400C            =1   892    FDBK0:   JC     FDBK2            ;JUMP SINCE MAX WORDS NOT REACHED
04EA 532FF0          =1   893             ANL    FLAG3,#0F0H      ;RESET FEEDBACK COUNTER TO 0
04ED D082            =1   894    FDBK1:   POP    DPL
04EF D083            =1   895             POP    DPH
04F1 D0D0            =1   896             POP    PSW
04F3 D0E0            =1   897             POP    ACC
04F5 22              =1   898             RET
04F6 E522            =1   899    FDBK2:   MOV    A,FLAG3
04F8 0522            =1   900             INC    FLAG3
04FA 5407            =1   901             ANL    A,#007H
04FC 23              =1   902             RL     A
04FD 900501          =1   903             MOV    DPTR,#JMPFBK
0500 73              =1   904             JMP    @A+DPTR
0501 A144            =1   905    JMPFBK:  AJMP   FDBKW0
0503 A13A            =1   906             AJMP   FDBKW1
0505 A124            =1   907             AJMP   FDBKW2
0507 A124            =1   908             AJMP   FDBKW3
0509 A122            =1   909             AJMP   FDBKW4
050B A120            =1   910             AJMP   FDBKW5
050D A11E            =1   911             AJMP   FDBKW6
050F A82F            =1   912    FDBKW7:  MOV    R0,INDAD2        ;SEND BACK DATA AT INDAD2 ADDRESS
0511 8628            =1   913             MOV    SERF2,@R0
0513 08              =1   914             INC    R0
0514 8629            =1   915             MOV    SERF3,@R0
0516 D000            =1   916             POP    00H
0518 E508            =1   917             MOV    A,AXIS
051A 2414            =1   918             ADD    A,#14H
051C A157            =1   919             AJMP   SERFBK
051E 81ED            =1   920    FDBKW6:  AJMP   FDBK1            ;SEND NOTHING FOR WORD 6
0520 81ED            =1   921    FDBKW5:  AJMP   FDBK1            ;SEND NOTHING FOR WORD 5
0522 81ED            =1   922    FDBKW4:  AJMP   FDBK1            ;SEND NOTHING FOR WORD 4

0524 81ED            =1   923    FDBKW3:  AJMP   FDBK1            ;SEND NOTHING FOR WORD 3
0526 C000            =1   924    FDBKW2:  PUSH   00H
0528 2030E4          =1   925             JB     FLAG4.4,FDBKW7   ;ALTERNATE FEEDBACK OF DATA
052B A82E            =1   926             MOV    R0,INDAD1        ;SEND BACK DATA AT INDIRECT ADDRESS
052D 8628            =1   927             MOV    SERF2,@R0
052F 08              =1   928             INC    R0
0530 8629            =1   929             MOV    SERF3,@R0
0532 D000            =1   930             POP    00H
0534 E508            =1   931             MOV    A,AXIS
0536 2408            =1   932             ADD    A,#08H
0538 A157            =1   933             AJMP   SERFBK
053A 856228          =1   934    FDBKW1:  MOV    SERF2,FLOWPM
053D 856329          =1   935             MOV    SERF3,FLOWPL
0540 741F            =1   936             MOV    A,#1FH
0542 A157            =1   937             AJMP   SERFBK
0544 851028          =1   938    FDBKW0:  MOV    SERF2,YM         ;SEND BACK YM,YL
0547 851129          =1   939             MOV    SERF3,YL
054A E510            =1   940             MOV    A,YM
054C B528F5          =1   941             CJNE   A,SERF2,FDBKW0   ;SEE IF YM HAS CHANGED DUE TO INTERRUPT
054F E508            =1   942             MOV    A,AXIS
0551 2404            =1   943             ADD    A,#04H
0553 B23C            =1   944             CPL    FLAG4.4          ;CPL TO ALTERNATE FEEDBACK DATA
0555 A157            =1   945             AJMP   SERFBK
                     =1   946    ;
                     =1   947    ;*********************************************************************
                          948    ;
                          949    ;***************************************************************
                          950    ;
                          951 +1 $IC(:F2:SERFBK.SA)
                     =1   952    ;SERFBK   SERIAL REG. LOADING ROUTINE FOR FEEDING DATA BACK TO MASTER
                     =1   953    ;
                     =1   954    ;    THIS ROUTINE TAKES THE THREE BYTES STORED IN A,SERF2,SERF3 AND FINDS
                     =1   955    ;THE PARITY OF EACH, STORES THE SECOND AND THIRD BYTE, AND STARTS THE
                     =1   956    ;SERIAL OUTPUT SEQUENCE.
                     =1   957    ;
                     =1   958    ;    A =FUNCTION POINTER (WHERE DATA IS TO BE PUT IN MASTER)
                     =1   959    ;    SERF2=FIRST DATA BYTE
                     =1   960    ;    SERF3=SECOND DATA BYTE
                     =1   961    ;
0557 A2D0            =1   962    SERFBK:  MOV    C,P              ;1ST BYTE IS ALREADY IN ACC.
0559 92E7            =1   963             MOV    ACC.7,C          ;STORE PARITY OF FIRST BYTE IN ACC.7
055B C528            =1   964             XCH    A,SERF2          ;GET 2ND BYTE
055D A2D0            =1   965             MOV    C,P
055F C528            =1   966             XCH    A,SERF2
```

```
0561 92E6      =1    967          MOV    ACC.6,C        ;STORE PARITY OF SECOND BYTE IN ACC.6
0563 C529      =1    968          XCH    A,SERF3        ;GET 3RD BYTE
0565 A2D0      =1    969          MOV    C,P
0567 C529      =1    970          XCH    A,SERF3
0569 92E5      =1    971          MOV    ACC.5,C        ;STORE PARITY OF THIRD BYTE IN ACC.5
056B D238      =1    972          SETB   FLAG4.0
056D D2B8      =1    973          SETB   TB8
056F F599      =1    974          MOV    SBUF,A         ;SEND FIRST BYTE
0571 81ED      =1    975          AJMP   FDBK1
               =1    976          ;
               =1    977          ;*********************************************************************

MCS-51 MACRO ASSEMBLER

LOC  OBJ              LINE    SOURCE

978 +1    $NOLIST

ASSEMBLY COMPLETE, NO ERRORS FOUND
```

We claim:

1. An electrohydraulic system with distributed control comprising
a plurality of electrohydraulic devices responsive to electronic control signals for performing hydraulic operations and control means for providing said control signals, said control means including a plurality of individual device control means each associated with and dedicated to directly controlling operation at an associated hydraulic device, master control means and means coupling said master control means to all of said device control means for coordinating operation of said device control means and said hydraulic devices controlled thereby,
said coupling means comprising a bus common to all of said master and device control means, all of said device control means being constructed for connection to said common bus for individual communication with said master control means,
said bus comprising a serial data bus, and each of said master and device control means including means for transmitting and receiving data on said bus,
said master control means including means for establishing a repetitive time sequence of communication windows and means for communicating with each of said device control means in turn during an associated said window, each said device control means including means for communicating with said master control means only during an associated said window, and means for performing control operation at the associated said device other than during said associated window,
each said master and device control means including memory means, means for receiving both address and data information, and means for storing said data information at locations in said memory means indicated by said address information.

2. The system set forth in claim 1 characterized in that each of said device control means includes means for establishing a communication address unique from addresses of all other device control means connected to said bus, said master control means including means for communicating with said device control means individually as a function of associated device addresses.

3. The system set forth in claim 1 wherein one of said hydraulic devices comprises an hydraulic pump, wherein said master control means includes means for establishing a maximum load at said pump, and wherein said device control means includes a pump controller coupled to said pump and responsive to maximum load signals from said master control means for limiting operation at said pump to said maximum load.

4. An electrohydraulic system with distributed control comprising
a plurality of electrohydraulic devices responsive to electronic control signals for performing hydraulic operations and control means for providing said control signals, said control means including a plurality of individual device control means each associated with and dedicated to directly controlling operation at an associated hydraulic device, master control means and means coupling said master control means to all of said device control means for coordinating operation of said device control means and said hydraulic devices controlled thereby,
said coupling means comprising a bus common to all of said master and device control means, all of said device control means being constructed for connection to said common bus for individual communication with said master control means,
one of said hydraulic devices comprising an hydraulic pump, said master control means including means for establishing a maximum load at said pump, said device control means including a pump controller coupled to said pump and responsive to maximum load signals from said master control means for limiting operation at said pump to said maximum load.

5. The system set forth in claim 4 wherein said pump comprises variable displacement pump, and wherein said pump controller includes means for receiving a flow command signal and a speed limit command signal from said master controller, means for receiving a signal indicative of actual speed at said pump, means responsive to said flow command signal and to said speed-indicating signal for determining pump displacement necessary to satisfy said flow command signal, means responsive to said speed limit command signal and to said speed-indicating signal for determining available pump displacement, and means for controlling displacement at said pump as a function of the lesser of said necessary displacement and said available displacement.

6. An electrohydraulic system with distributed control comprising
a plurality of electrohydraulic devices responsive to electronic control signals for performing hydraulic operations and control means for providing said control signals, said control means including a plurality of individual device control means each associated with and dedicated to directly controlling operation at an associated hydraulic device, master control means and means coupling said master control means to all of said device control means for coordinating operation of said device control means and said hydraulic devices controlled thereby, said coupling means comprising a bus common to all of said master and device control means, all of said device control means being constructed for connection to said common bus for individual communication with said master control means, said master control means including means for establishing a maximum load at one of said hydraulic devices, said device control means including a controller coupled to said one of said devices and responsive to maximum load signals from said master control means for limiting operation at said one of said devices to said maximum load.

7. The system set forth in claim 6 characterized in that each said individual device control means comprises a microprocessor-based electronic control package assembled as a single unit with the associated said electrohydraulic device, and that said master control means includes a signal output port and means for supplying control signals to said output port, in that each said device control means includes a signal input port and means for controlling operation of the associated said device as a function of signals received at said input port, and in that said coupling means comprises a signal bus connecting all of said signal input ports in common to said output port.

8. The system set forth in claim 7 characterized in that said master control means includes a signal input port, in that each of said device control means includes a signal output port and means for applying signals to said device output port as a function of operation of the associated said device, and in that said coupling means further comprises a second signal bus connecting all of said device output ports in common to said master input port.

9. The system set forth in claim 8 characterized in that each said device control means includes means for establishing a communication address unique from addresses of all other device control means connected to said buses, said master control means including means for communicating with said device control means individually as a function of associated device addresses.

10. The system set forth in claim 9 wherein said master control means includes means for establishing a repetitive time sequence of communication windows and means for communicating with each of said device control means in turn during an associated said window, and wherein each said device control means includes means for communicating with said master control means only during an associated said window, and means for performing control operations at the associated said device other than during said associated window.

11. The system set forth in claim 7, 8 or 9 wherein said coupling means further comprises a third bus and means for applying electrical power to said third bus, and wherein each of said device control means includes means for connection to said third bus for receiving electrical power therefrom, electrical power at said device control means being obtained solely from said buses.

12. The system set forth in claim 6 wherein each said device control means includes microprocessor-based control means having stored therein multiple control programs for generating control signals as differing functions of the associated said device, said master control means including means for selecting among said control programs and commanding operation at each said device control means according to the selected control program through communication on said bus.

13. The system set forth in claim 12 wherein each said device control means includes means for storing parameters for said control programs, and wherein said master control means includes means for downloading said parameters to said device control means through communications on said bus.

14. The system set forth in claim 6 wherein said bus comprises a serial data bus, and wherein each of master and device control means includes means for transmitting and receiving data on said bus.

15. The system set forth in claim 14 wherein each of said master and device control means includes separate transmission and reception ports, and wherein said bus includes first means connecting said transmission port at said master control means in common to said reception ports at all of said device control means, and second means connecting said transmission ports at all of said device control means in common to said reception port at said master control means.

16. The system set forth in claim 2, 14 or 15 further comprising means for applying electrical power to at least one conductor of said bus, and wherein each of said device control means includes means for connection to said at least one conductor for receiving electrical power therefrom, electrical power at said device control means being obtained solely from said bus.

17. The system set forth in claim 6 wherein said master control means includes means for establishing a repetitive time sequence of communication windows and means for communicating with each of said device control means in turn during an associated said window, and wherein each said device control means includes means for communicating with said master control means only during an associated said window, and means for performing control operations at the associated said device other than during said associated window.

18. The system set forth in claim 17 wherein each window in said repetitive time sequence is of fixed time duration.

* * * * *